US006403219B1

(12) United States Patent
Liao

(10) Patent No.: US 6,403,219 B1
(45) Date of Patent: Jun. 11, 2002

(54) COMPOSITE SOLID PARTICLE

(75) Inventor: Jiefan Liao, Tokyo (JP)

(73) Assignee: Nara Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/562,074

(22) Filed: May 1, 2000

Related U.S. Application Data

(62) Division of application No. 09/201,119, filed on Nov. 30, 1998.

(30) Foreign Application Priority Data

Dec. 1, 1997 (JP) .............................................. 9-345790

(51) Int. Cl.$^7$ ................................................ B32B 27/00
(52) U.S. Cl. ...................... 428/407; 428/430; 428/404; 428/357
(58) Field of Search ................................ 428/403, 409, 428/407, 357

(56) References Cited

U.S. PATENT DOCUMENTS

| 4,915,987 A | 4/1990 | Nara et al. ................. 427/180 |
| 5,271,969 A | * 12/1993 | Ogura ........................ 427/561 |
| 5,336,271 A | 8/1994 | Ishizaka et al. ........... 23/293 R |
| 5,876,793 A | 3/1999 | Sherman et al. ........... 427/213 |

* cited by examiner

Primary Examiner—Blaine Copenheaver
Assistant Examiner—Christopher Paulraj
(74) Attorney, Agent, or Firm—Oliff & Berridge, PLC

(57) ABSTRACT

The invention relates to a composite solid particle obtained by sticking fine particles on the surface of a core particle by applying impact and then allowing a crystal of a fine particle component to grow on the fine particle-core particle composite with the stuck fine particles described above being used as crystal nuclei and to a production process for the same.

9 Claims, 2 Drawing Sheets

COMPOSITE SOLID PARTICLE

This is a Division of Application No. 09/201,119 filed Nov. 30, 1998. The entire disclosure of the prior application is hereby incorporated by reference herein in its entirety.

BACKGROUND OF THE INVENTION

1. Field of Invention

The invention relates to the technical field of a surface-modified composite solid particle and a method for producing the same.

2. Description of Related Art

There has so far been known in, for example, U.S. Pat. No. 4,915,987, a production process for a composite solid particle for the purposes of preventing coagulation, discoloration and deterioration and elevating dispersibility, catalytic effect and magnetic characteristics by fixing fine particles (hereinafter referred to as fine particles) on the surface of another particle which becomes a core (hereinafter referred to as a core particle). It has become possible to efficiently produce a functional composite or hybrid powder material (composite or hybrid powder) which is homogeneous and has stable characteristics by employing a high velocity gas stream impact method which is a dry particle compositing method requiring no organic solvent and no water, which is described therein.

However, in the composite solid particle produced by the method described above, the fine particles are merely stuck evenly on the surface of the core particle, and therefore a rough weight proportion of the fine particles exerting influence on an improvement in the functionality to the core particle depends on the surface area of the core particle and the cross section (projected area) of the fine particle. In general, it is considered that the maximum weight proportion of the fine particles to the core particle is a proportion in which the fine particles cover the surface of the core particle only in roughly one layer. Thus, the maximum weight proportion of the fine particles to the core particle is calculated from:

maximum weight proportion=$(4rp1/Rp0) \times 100\%$ where:
- r=radius of the fine particle
- R=radius of the core particle
- p1=density of the fine particle
- p0=density of the core particle As a result thereof, if the radii and the densities of the core particle and the fine particles are fixed, the maximum weight proportion of the fine particles is settled, and the weight proportion exceeding this cannot be achieved, which brings about the problem that little further elevation in the function can be expected. Thus, the problem to be solved by the invention is addressed to this point.

SUMMARY OF THE INVENTION

An object of the invention is to solve the problems discussed above.

The invention relates to a method for producing a composite solid particle by fixing fine particles on the surface of a core particle firmly in a non-peelable state, wherein the fine particles are embedded on the surface of the core particle, and then crystal of a fine particle component is allowed to grow on the above fixed fine particle-core particle composite.

The invention also relates to a composite solid particle obtained by modifying the surface of a solid particle by fixing fine particles on the surface of the core particle firmly in a non-peelable state, wherein crystal of a fine particle component is allowed to grow on the fixed particle-core particle composite.

In this regard, the fixed fine particle-core particle composite is mixed in a fine particle component solution to allow the crystal of the fine particle component to grow with the fixed fine particles described above being used as crystal nuclei. The fine particle component solution described above is produced by causing the fine particle component to react in a liquid phase. The fine particle component described above is calcium monohydrogenphosphate.

In this case, the crystal of the fine particle component is allowed to grow in an aqueous solution in which a hydrogen ion exponent (pH value) is adjusted to a range of 4 and 6, preferably between 4.5 and 5.8 and more preferably to 5.7.

Calcium monohydrogenphosphate is generated by adding pyrophosphoric acid to a suspension of calcium hydroxide and allowing them to react.

In the particle obtained by allowing the crystal to grow by carrying out the process of the invention, the content of the fine particles can be adjusted by the degree of the crystal growth, and therefore control can be carried out so that the content of the fine particles is freely increased, which has so far been found to be impossible using a conventional fixing method.

When the crystal grows long, as is the case with needle-like and columnar crystals, the surface area of the fine particle can notably be expanded.

Further, there can be obtained, as well, a composite solid particle in which needle-like and columnar crystals are connected to a core particle at a longitudinal end, which has so far been unobtainable using a conventional fixing method.

As the results described above, the composite solid particle obtained by allowing the fine particle component to grow to crystal not only can improve and elevate various functions (for example, electronic and magnetic characteristics, optical characteristics, thermal characteristics and biological characteristics) held by the fine particle to a large extent, but can also raise the compression moldability and the content-uniformizing characteristics. Further, a rise in the surface area of the fine particle can elevate various reaction rates.

The composite solid particle can be used for electric and electronic materials, magnetic materials, optical functional materials, medicines, cosmetics, biological materials and construction materials.

BRIEF DESCRIPTION OF THE DRAWINGS

The invention will be described with reference to the figures, in which.

DETAILED DESCRIPTION OF PREFERRED EMBODIMENTS

Figure 1:
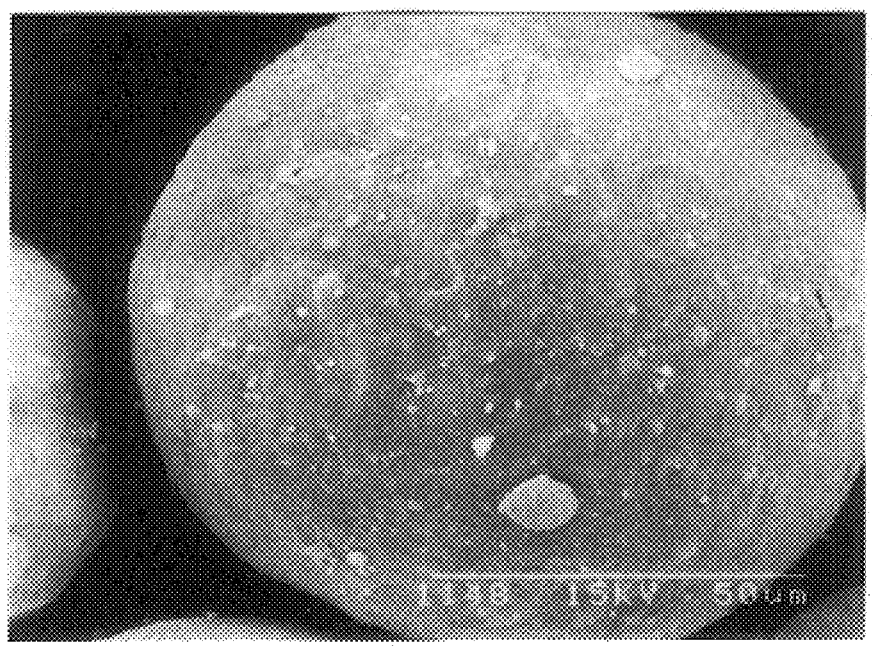
FIG. 1 is a photograph of a composite (solid) particle obtained by sticking calcium monohydrogenphosphate on the surface of a nylon 12 spherical particle, which is a core particle, the photograph taken by means of a scanning type electron microscope.

The core particle used for producing the composite solid particle of the invention includes, for example, various celluloses and derivatives thereof, such as crystalline cellulose, hydroxypropyl cellulose and carboxymethyl cellulose; starches and derivatives thereof, such as potato starch, corn starch, wheat starch, partially soluble starch and dextrin; sugars, such as lactose, and synthetic polymers, such as nylon, polyethylene and polystyrene. Further, there can also be used as the core particle, metal powders of iron, nickel, aluminum and copper, and inorganic matters, such as alumina, zirconium and silicon carbide.

The fine particle includes materials having a characteristic of crystal growth, such as various crystalline inorganic compounds and organic compounds.

The crystalline inorganic compounds include hydroxides, halides, carbonates,. sulfates, nitrates, phosphates, hydrogenphosphates and silicates of various metals.

The crystalline organic compounds include crystalline chemicals, such as ibuprofen, ketoprofen, indometacin, phenacetin, oxyphenbutazone, ethenezamide, salicylic acid and benzoic acid.

Further, when it is intended to obtain a composite particle in which crystal of a metal oxide, having a very small solubility in water, is allowed to grow on the surface of a core particle, the composite particle can be obtained by allowing the crystal to grow in the form of a hydroxide, halide, carbonate, sulfate, nitrate, phosphate or hydrogenphosphate of metal and then calcining it.

Conventionally known methods can be employed as a method for sticking the fine particles on the core particle. To be specific, various mechanical fixing methods exist, including high velocity gas stream impact methods, such as described in U.S. Pat. No. 4,915,989 and U.S. Pat. No. 5,336,271, the disclosures of which are incorporated herein. However, the method shall not be restricted to the described methods as long as the method used can attach the fine particles on the core particle.

The size of the core particle falls suitably in a range of 0.5 $\mu$m to 2 mm. When the high velocity gas stream impact method is used as the method for sticking the fine particles on the core particle, the core particle having a size of less than 0.5 $\mu$m floats in the gas stream, so that the impact force is difficult to transmit to the particle. On the other hand, if the size exceeds 2 mm, the core particle is liable to be broken by impact, so that it is difficult to obtain the prescribed quality, and the efficiency is not good. The shape of the core particle is preferably spherical or elliptical but may be another, unspecified herein, shape.

The size of the fine particle is preferably 1/5 or less, more preferably 1/10 or less of that of the core particle in various mechanical methods (fixing methods). To be specific, the particle diameter thereof is 0.01 to 10 $\mu$m. When the high velocity gas stream impact method is used, the crystalline particle is selectively pulverized in an impact chamber of a powder surface-modifying treatment apparatus described later, and therefore it does not specifically matter how big the fine particle (substance to be fixed) is.

A method for allowing crystal growth includes a method for allowing physical growth, such as vacuum deposition, and a method for allowing growth in a vapor phase, a liquid phase or a solid phase. Any growth method can be used. For example, a liquid phase-growing method is a method in which the crystal is allowed to grow from a solution obtained by dissolving a fine particle material (solute) in a solvent in a supersaturated state. The solution of a supersaturated state can be obtained by using a conventional method, for example, cooling a solution, evaporating a solvent, or applying a pressure to a solution, or such reactions as solid-liquid, liquid-liquid, or vapor-liquid reaction.

When the fine particle is calcium monohydrogenphosphate ($CaHPO_4$), it has a very limited solubility in water (0.02 g/100 g at 24.5° C.), and therefore the crystal is allowed to grow in a supersaturated state obtained by a reaction method such as a solid-liquid reaction method. For example, the crystal is suitably allowed to grow with calcium monohydrogenphosphate fixed on the core particle being used as a crystal nucleus while reacting a calcium hydroxide suspension with pyrophosphoric acid to form calcium monohydrogenphosphate. In this case, the reaction liquid has a hydrogen ion exponent (pH value) adjusted to a range of 4 to 6, preferably between 4.5 and 5.8, and more preferably to 5.7.

Experimental Example

The experimental example used nylon 12 as the core particle and calcium monohydrogenphosphate as the fine particle. Preparation of fine particle-core particle composite:

A mixed powder was made of a spherical particle (SP-500L type, manufactured by Toray Co., Ltd.) of nylon 12 having an average particle diameter of 50 $\mu$m, as a core particle, and tabular calcium monohydrogenphosphate (manufactured by Wako Junyaku Ind. Co., Ltd.) having an average side length of about 50 $\mu$m, as a fine particle, in a weight ratio of 10:1. The mixed powder was treated, using the method described in Japanese Patent Publication No. 3-2009, under the following conditions using a powder surface-modifying treatment apparatus (NHS-O type, manufactured by Nara Machinery Co., Ltd.), to obtain a fine particle-stuck particle composite in which calcium monohydrogenphosphate, pulverized selectively in an impact chamber of the powder surface-modifying treatment apparatus described above, was embedded onto and fixed on the surface of the nylon 12 spherical particle in the form of a stuck particle to thereby allow calcium monohydrogenphosphate to be stuck on the surface:

charged amount: 10 g revolution number: 12000 rpm treating time: 5 minutes

A scanning type electron microscopic photograph of this fine particle-stuck particle composite is shown in FIG. 1. Preparation of calcium monohydrogenphosphate-generated solution:

Added to a vessel charged with 100 g of purified water was 0.7409 g of fine particle-shaped calcium hydroxide (manufactured by Kanto Chemical Co., Ltd.), to prepare a calcium hydroxide suspension, and 100 g of pyrophosphoric acid (manufactured by Showa Chemical Co., Ltd.) aqueous solution having a concentration of 0.05 moul. The acid was slowly added to the suspension over a period of 10 minutes while stirring the mixture. Then stirring was carried out for two hours by means of a magnetic stirrer (RC-10 type, manufactured by Tokyo Rika Kikai Co., Ltd.), and the reaction liquid was filtered, in order to remove large-sized crystals formed at an initial stage of the reaction and impurities, to obtain a calcium monohydrogenphosphate-generated solution in the form of a filtrate. The generated solution comprised a fine suspension of calcium monohydrogenphosphate.

Figure 2:
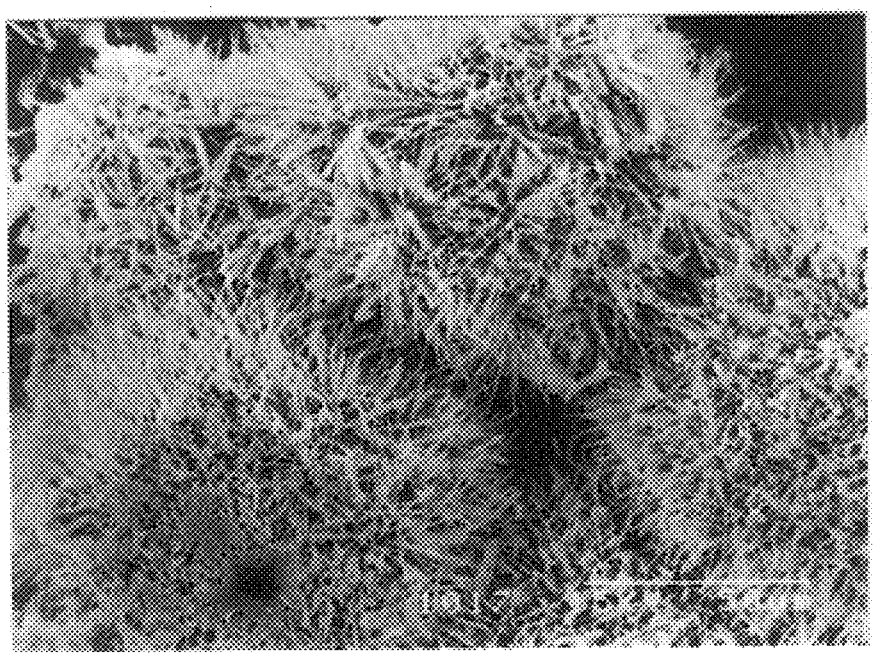
FIG. 2 is a photograph of a composite (solid) particle obtained by allowing crystal to grow in an experimental example, the photograph taken by means of the scanning type electron microscope.

The solution was controlled to a pH value of 5.70 by purified water and the pyrophosphoric acid aqueous solution described above. Formation of crystal-grown particle:

50 g of the calcium monohydrogenphosphate-generated solution prepared above was put into a glass vessel charged with 100 milligrams of the fine particle-stuck particle composites prepared above. To mix them well, the vessel was hand shaken, and then the vessel was tightly sealed and left to stand at 25° C. After seven days, composite solid particles were obtained in which crystals grew in a needle-like form with calcium monohydrogenphosphate embedded on the surface of the nylon spherical particle used as a crystal nucleus. The solution was filtered, and the filtered substances obtained were washed with water and dried, whereby the composite solid particles in which the fine particle component grown to crystals was obtained. A scanning type electron microscopic photograph of this composite particle is shown in FIG. 2.

Even when subjected to some impact, the crystal-grown particles obtained above were not peeled off from the core particle, and it was confirmed that the crystals had grown in a firmly sticking, or fixed, state.

Comparative Example 1

Figure 3:
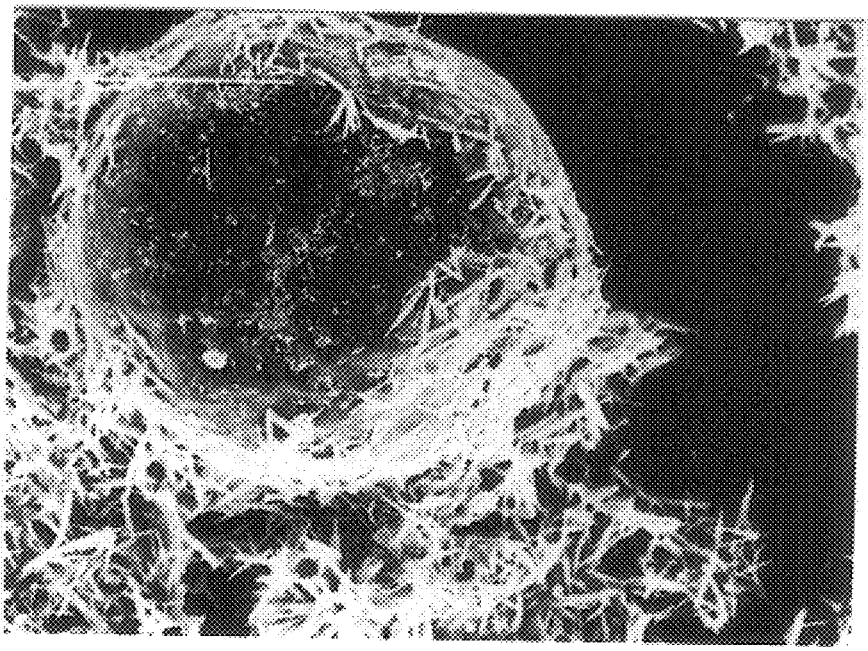
FIG. 3 is a photograph of a particle obtained in Comparative Example 1, the photograph taken by means of the scanning type electron microscope.

The same treatment as in the Experimental Example described above was carried out to try crystal growth, except that the mixed powder of the nylon 12 spherical particles and calcium monohydrogenphosphate in a weight ratio of 10:1 was not subjected to fixing treatment by means of the powder surface-modifying treatment apparatus. A scanning type electron microscopic photograph of a particle obtained as a result thereof is shown in FIG. 3. It was initially observed the crystals apparently grew on the core particle, but it was confirmed that the crystals were readily peeled off of the core particle.

Comparative Example 2

Figure 4:
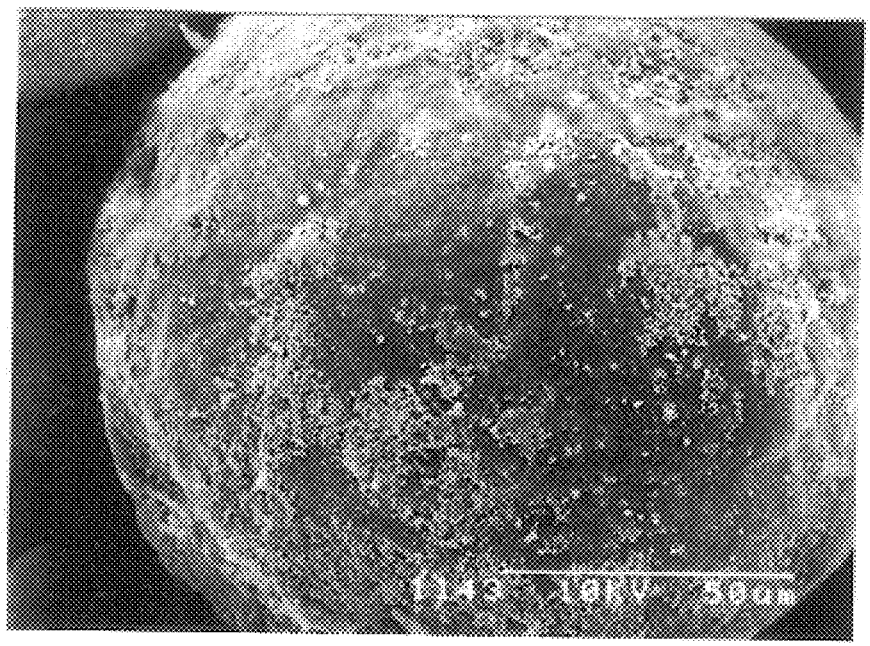
FIG. 4 is a photograph of a particle obtained in Comparative Example 2, the photograph taken by means of the scanning type electron microscope.

The same treatment as in the Experimental Example described above was carried out, except that the generated solution prepared above was controlled to a pH value of 6.3. In this case, crystal growth was not observed. A scanning type electron microscopic photograph of the particle thus obtained is shown in FIG. 4.

What is claimed is:

1. A composite solid particle obtained by modifying the surface of a solid, core particle by fixing particles on the surface of the core particle in a non-peelable state, wherein crystal of a fixed particle component is allowed to grow as columnar or needle-shaped structures on the core particle in which the fixed particles are stuck on the surface of the core particle.

2. The composite solid particle as described in claim 1, wherein the core particle with fixed particles is mixed in a fixed particle component solution to allow the crystal of the fixed particle component to grow with the fixed particles being used as crystal nuclei.

3. The composite solid particle as described in claim 2, wherein the fixed particle component solution is produced by causing the fixed particle component to react in a liquid phase.

4. The composite solid particle as described in claim 3, wherein the fixed particle component is calcium monohydrogenphospate.

5. The composite solid particle as described in claim 4, wherein the crystal of the fixed particle component is allowed to grow in an aqueous solution of calcium monohydrogenphosphate in which pH is adjusted between 4.5 and 5.8.

6. The composite solid particle as described in claim 5, wherein the pH is adjusted to 5.7.

7. The composite solid particle as described in claim 5, wherein the fixed particle component is grown from a solution of calcium monohydrogenphosphate produced by adding pyrophosphoric acid to a suspension of calcium hydroxide.

8. The composite solid particle as described in claim 4, wherein the fixed particle component is grown from a solution of calcium monohydrogenphosphate produced by adding pyrophosphoric acid to a suspension of calcium hydroxide.

9. The composite solid particle as described in claim 1, wherein the size of the core particle is in a range of 0.5 $\mu$m to 2mm.

* * * * *